US009556900B2

(12) United States Patent
Dayot et al.

(10) Patent No.: US 9,556,900 B2
(45) Date of Patent: Jan. 31, 2017

(54) LIGHT HOLLOWED SPHERICAL PLAIN BEARING

(71) Applicants: Camille Dayot, Valence (FR); Arnaud Turmeau, Mallisard (FR)

(72) Inventors: Camille Dayot, Valence (FR); Arnaud Turmeau, Mallisard (FR)

(73) Assignee: SKF AEROSPACE FRANCE S.A.S., Saint-Vallier (FR)

( * ) Notice: Subject to any disclaimer, the term of this patent is extended or adjusted under 35 U.S.C. 154(b) by 0 days.

(21) Appl. No.: 14/715,647

(22) Filed: May 19, 2015

(65) Prior Publication Data

US 2015/0337896 A1    Nov. 26, 2015

(30) Foreign Application Priority Data

May 20, 2014 (EP) .................................... 14305746

(51) Int. Cl.
| F16C 23/04 | (2006.01) |
| F16C 33/10 | (2006.01) |
| B22D 19/00 | (2006.01) |
| B22F 5/10 | (2006.01) |
| F16C 33/14 | (2006.01) |
| F16C 43/02 | (2006.01) |

(52) U.S. Cl.
CPC ......... *F16C 23/045* (2013.01); *B22D 19/0072* (2013.01); *B22F 5/10* (2013.01); *F16C 23/043* (2013.01); *F16C 33/102* (2013.01); *F16C 33/103* (2013.01); *F16C 33/1085* (2013.01); *F16C 33/14* (2013.01); *F16C 43/02* (2013.01); *F16C 2220/00* (2013.01); *F16C 2220/02* (2013.01); *F16C 2326/43* (2013.01); *Y10T 29/49648* (2015.01)

(58) Field of Classification Search
CPC ..... B22F 3/1055; F16C 23/043; F16C 23/045; F16C 33/103; F16C 33/1045; F16C 33/1085
USPC ..... 29/898.043, 898.049; 384/192, 208, 212, 384/213
See application file for complete search history.

(56) References Cited

U.S. PATENT DOCUMENTS

| 2,827,340 | A | * | 3/1958 | Johnson | ................ F16C 23/045 |
| | | | | | 384/209 |
| 3,437,307 | A | * | 4/1969 | Atwater | ............... B22D 19/085 |
| | | | | | 164/98 |
| 3,683,474 | A | | 8/1972 | Young, Jr. | |
| 3,786,543 | A | * | 1/1974 | Sato | ....................... B22D 19/12 |
| | | | | | 164/100 |
| 4,765,757 | A | | 8/1988 | Hartl | |
| 4,910,788 | A | | 3/1990 | Shimizu | |
| 2007/0274618 | A1 | * | 11/2007 | Sandin | ................. B65G 49/063 |
| | | | | | 384/212 |

(Continued)

FOREIGN PATENT DOCUMENTS

DE        19642193 A1    4/1984

*Primary Examiner* — Phillip A Johnson
(74) *Attorney, Agent, or Firm* — Bryan Peckjian; SKF USA Inc. Patent Dept.

(57) ABSTRACT

A spherical plain bearing comprising an inner ring having an outer spherical contact surface and an outer ring having an inner spherical contact surface. The outer spherical contact surface of the inner ring cooperates with the inner spherical contact surface of the outer ring. At least one of the inner ring and the outer ring comprises at least one internal cavity running on at least a portion of the circumference of said ring.

14 Claims, 2 Drawing Sheets

(56) References Cited

U.S. PATENT DOCUMENTS

2015/0104123 A1* 4/2015 Ertas .................... F01D 25/164
384/119

* cited by examiner

LIGHT HOLLOWED SPHERICAL PLAIN BEARING

CROSS REFERENCE TO RELATED APPLICATIONS

This is a Non-Provisional Patent Application, filed under the Paris Convention, claims the benefit of Europe Patent (EP) Application No. 14305746.1 filed on 20 May 2014, which is incorporated herein by reference in its entirety.

TECHNICAL FIELD

The invention relates to a spherical plain bearing, to a bearing assembly comprising such a bearing and to a method for manufacturing such a spherical plain bearing.

BACKGROUND ART

Aircrafts are often equipped with spherical plain bearings. As aircrafts are getting lighter in order to reduce fuel consumption and improve maneuverability, bearings used in aircrafts must also be as light as possible.

It is known to use spherical plain bearings made of light materials, such as titanium, but such materials are costly. It is also known to increase the acceptable loads for the envelope of bearings manufactured with light but less resistant materials by adding a coating which locally improves the mechanical characteristics of the material. Such techniques do not prove satisfactory.

The aim of the invention is to provide a new spherical plain bearing, whose structure permits to obtain a bearing which is lighter than the bearings of the prior art, without deteriorating the mechanical properties of the bearing.

To this end, the invention concerns a spherical plain bearing comprising an inner ring and an outer ring, the inner ring comprising an outer spherical contact surface which cooperates with an inner spherical contact surface of the outer ring. This spherical plain bearing is characterized in that the inner ring and/or the outer ring comprises at least one internal cavity running on at least a portion of the circumference of said ring.

Thanks to the invention, the cavities make the rings of the spherical plain bearing lighter without substantially reducing their mechanical characteristics.

BRIEF SUMMARY OF THE INVENTION

According to further aspects of the invention which are advantageous but not compulsory, such a spherical plain bearing may incorporate one or several of the following features:

- On at least one of the rings, the or each cavity comprises ducts extending towards the spherical contact surface of the ring.
- A lubricant is inserted in the or each cavity.
- The or each ring comprises grooves provided on the spherical contact surface of said ring, and the ducts open into the grooves.
- At least one of the inner and outer rings comprises several cavities parallel to each other and extending around a central axis of the ring.
- The outer ring comprises two cavities extending around a central axis of the outer ring, the cavities being respectively located in the vicinity of a first axial end and a second axial end of the outer ring.
- The internal cavities are annular and extend on the whole circumference of the ring in which they are provided.

The invention also concerns a bearing assembly comprising a spherical plain bearing as mentioned here-above and a lubricant distribution device. Such a bearing assembly is characterized in that the lubricant distribution device is adapted to inject new lubricant in one of the cavities of one ring and to extract used lubricant from another cavity of the same ring.

The invention also concerns a method for manufacturing a spherical plain bearing as mentioned here-above, characterized in that the rings are manufactured by additive manufacturing.

The invention also concerns a method for manufacturing a spherical plain bearing as mentioned here-above, characterized in that the rings are manufactured by casting with cores.

The invention also concerns a method for manufacturing a spherical plain bearing as mentioned here-above, characterized in that the rings are manufactured as divided parts which are then assembled together.

BRIEF DESCRIPTION OF THE DRAWINGS

The invention will now be explained in reference with the annexed figures, as an illustrative example. In the annexed figures.

DETAILED DESCRIPTION OF THE INVENTION

Figure 1:
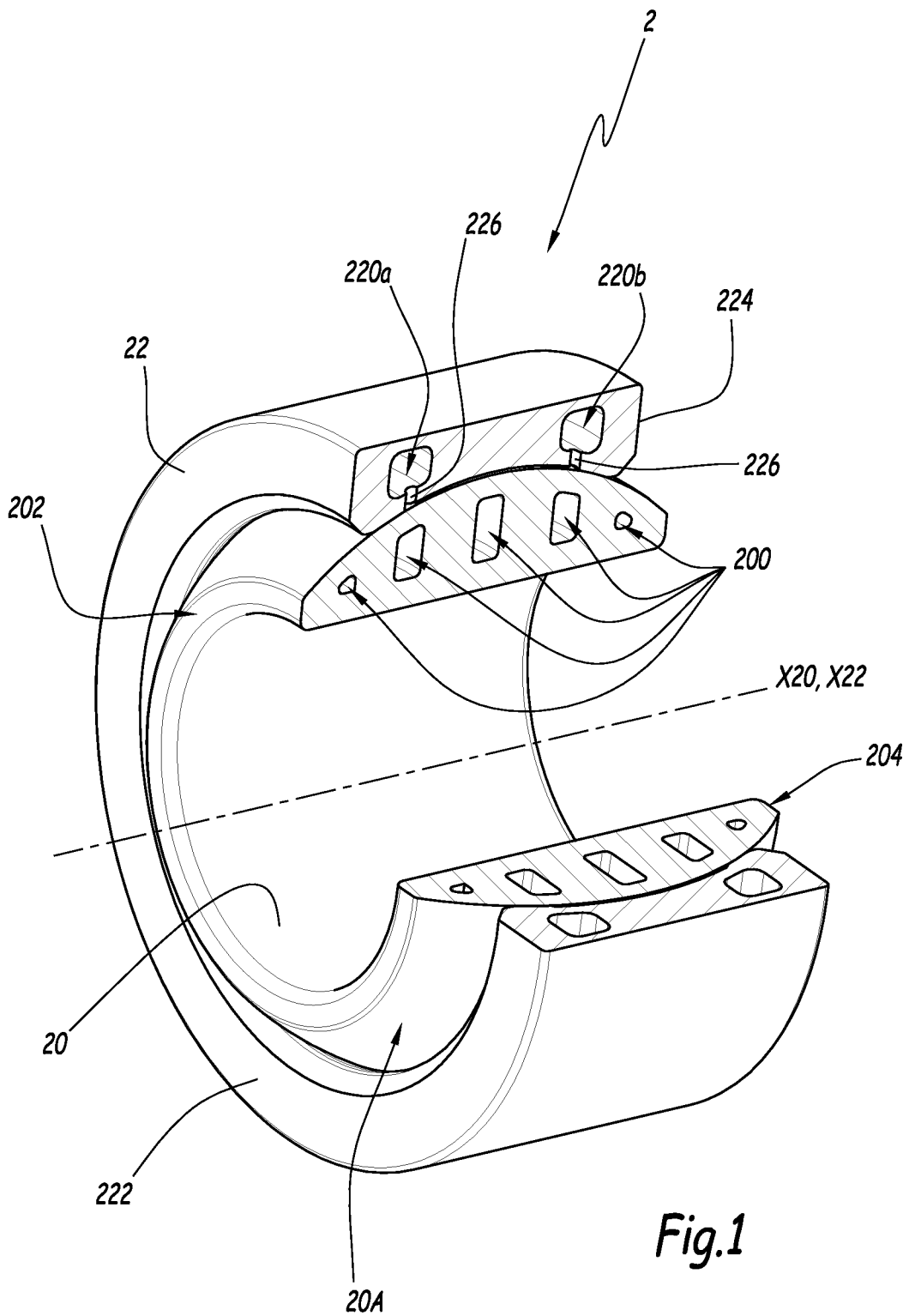
FIG. 1 is a perspective partially sectional view of a spherical plain bearing according to the invention.

FIG. 1 shows a spherical plain bearing 2. Spherical plain bearing 2 comprises an inner ring 20, which is represented only on FIG. 1, and an outer ring 22. Inner ring 20 comprises an outer spherical contact surface 20A, and outer ring 22 comprises an inner spherical contact surface 22A, which cooperates with outer spherical surface 20A.

According to the invention, inner ring 20 and/or outer ring 22 comprise at least one internal cavity running on at least a portion of the circumference of inner ring 20 or outer ring 22. As shown on FIG. 1, inner ring 20 comprises several internal cavities 200 extending around a central axis X20 of inner ring 20. Internal cavities 200 are annular and extend on the whole circumference of inner ring 20. Cavities 200 form toroid volumes centered on axis X20. Cavities 200 are parallel to each other. In other words, the walls of cavities 200 which are perpendicular to axis X20 are each parallel to each other.

Inner ring 20 extends between a first axial end 202 and a second axial end 204. Inner ring 20 comprises five cavities 200 regularly distributed along central axis X20 between axial end 202 and 204. The radial length of cavities 200 decreases towards ends 202 and 204.

Outer ring 22 comprises two internal cavities 220a and 220b which are annular and extend on the whole circumference of outer ring 22. Cavities 220a and 220b of outer ring 22 extend around central axis X22 of outer ring 22 and are respectively located in the vicinity of a first axial end 222 and a second axial end 224 of outer ring 22 along axis X22.

Internal cavities 220a, 220b and 200 are provided in areas of inner and outer rings 20 and 22 in which the mechanical stresses are the lowest, depending on the operating conditions of spherical plain bearing 2, so that the mechanical properties of bearing 2 are not substantially deteriorated by these cavities. Internal cavities 200, 220a and 220b permit to make lighter spherical plain bearings suitable for use in aircrafts.

Cavities 220a and 220b each comprises at least one duct 226 extending towards inner spherical contact surface 22A. Ducts 226 are radial cylindrical holes which form a fluid link between cavities 220a and 220b and inner contact surface 22A.

Figure 2:
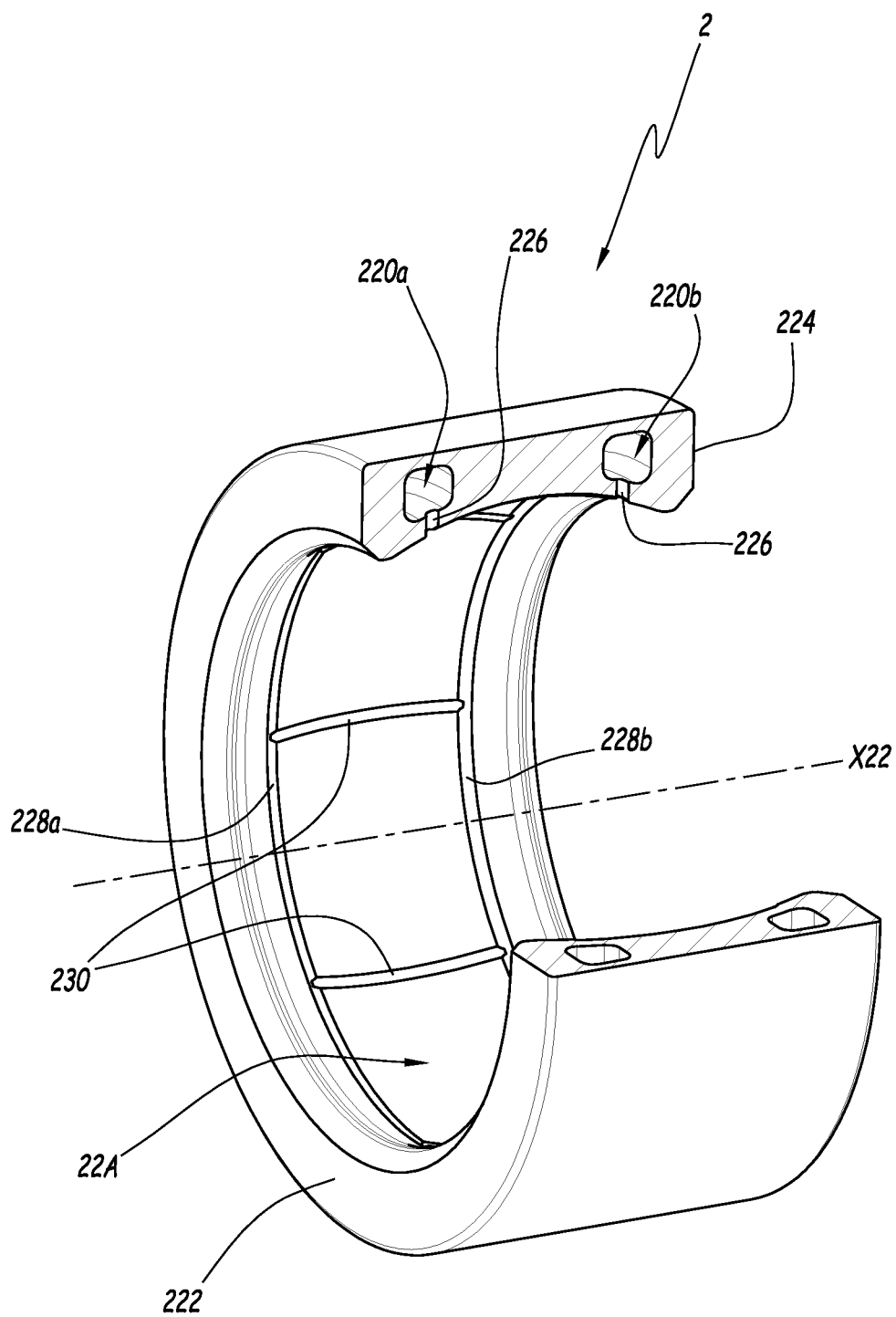
FIG. 2 is a view similar to FIG. 1, an inner ring of the spherical plain bearing of FIG. 1 being omitted.

Thanks to ducts 226, cavities 220a and 220b can form lubricant tanks. Before mounting in, for example, an aircraft, lubricant is inserted in cavities 220a and 220b. Ducts 226 permit to bring lubricant towards spherical contact surfaces 20A and 22A during the lifetime of bearing 2. In order to improve lubricant circulation on the entire circumference of the spherical contact between inner ring 20 and outer ring 22, at least one of outer and inner rings 20 and 22 comprises two circumferential grooves 228a and 228b. In the example of the figures, and as shown on FIG. 2, grooves 228a and 228b are provided on inner surface 22A and can extend on the whole circumference of outer ring 22. Advantageously, grooves 228a and 228b which are respectively aligned with cavities 220a and 220b so that ducts 226 open into grooves 228a and 228b.

An advantage of this feature is the reduction of maintenance when spherical plain bearing 2 is mounted in an aircraft. The presence of lubricant tanks in the bearing allows designing the bearings for the entire service life of an aircraft, so that the spherical plain bearings do not need to be dismounted or changed to bring a new quantity of lubricant or replace worn off parts.

As an optional feature, outer ring 22 includes grooves 230 provided on contact surface 22A, which link grooves 228a and 228b to each other, so that lubricant contained in cavity 220a can reach groove 228b and lubricant contained in cavity 220b can reach groove 228a. This improves the circulation of lubricant.

Alternatively, grooves 228a, 228b and 230 may be differently arranged on inner contact surface 22A, and inner contact surface 22A may comprise more than two circumferential grooves.

Inner ring 20 and outer ring 22 may be manufactured by casting with cores. The cores permit to obtain the internal cavities 200, 220a and 220b.

Alternatively, inner ring 20 and outer ring 22 may be manufactured as divided parts, which are then assembled together. The shapes of cavities 200, 220a and 220b are defined on complementary parts. Such a process avoids the use of complex casting systems.

Alternatively, inner ring 20 and outer ring 22 may be manufactured by additive manufacturing or 3D printing, which consists of creating a superposition of thin material layers by, for example, progressively laying down and melting a powder using a laser. The final shape of each ring including the cavities is directly obtained.

Spherical plain bearing 2 may be comprised into a bearing assembly which includes a non-shown lubricant distribution device adapted to inject new lubricant in one of the cavities of outer ring 22 and to extract used lubricant from the other cavity of outer ring 22. For example the lubricant distribution device may inject new lubricant in cavity 220a and extract used lubricant from cavity 220b, via ducts 226 and grooves 228a, 228b and 230. Such a lubricant distribution device and the structure of plain bearing 2 permit to more easily extract used lubricant, which may contain metal particles likely to damage the spherical contact surfaces 20A and 22A, from bearing 2.

According to a non-shown embodiment of the invention, inner ring 20 may also comprise ducts which extend between cavities 200 and spherical contact surface 20A so that lubricant can be inserted in cavities 200. A lubricant distribution device may also be adapted to run a lubricant circulation in inner ring 20 similar to outer ring 22.

According to a non-shown embodiment of the invention, cavities 200 may be used to host electronic components or devices such as RFID tags or sensors.

According to another non-shown embodiment, the internal cavities 200 of inner ring 20 and/or the internal cavities 220 of outer ring 22 may extend only on a limited portion of the circumference of inner and outer rings 20 and 22.

The features of the above-mentioned embodiments and variants can be combined to form new embodiments of the invention.

The invention claimed is:

1. A spherical plain bearing comprising:
    an inner ring being delineated by an inner ring exterior surface, the inner ring exterior surface comprising an outer spherical contact surface, and
    an outer ring being delineated by an outer ring exterior surface, the outer ring exterior surface comprising an inner spherical contact surface,
    wherein the outer spherical contact surface of the inner ring cooperates with the inner spherical contact surface of the outer ring,
    wherein at least one of the inner ring and the outer ring comprises an internal cavity running therein, the internal cavity being completely enclosed within the at least one of the inner ring and the outer ring such that there are no fluid passages extending between the internal cavity and the inner ring exterior surface or the outer ring exterior surface, and such that the internal cavity is not in fluid communication with a surroundings of the one of the inner ring and the outer ring.

2. The spherical plain bearing according to claim 1, wherein the internal cavity is within the inner ring, the spherical plain bearing comprising a second internal cavity within the outer ring, the second internal cavity further comprises ducts extending towards the inner spherical contact surface of the outer ring.

3. The spherical plain bearing according to claim 2, wherein a lubricant is inserted in the second internal cavity.

4. The spherical plain bearing according to claim 1, wherein the at least one of the inner ring and the outer ring further comprises several cavities parallel to each other and extending around a central axis of the one of the inner ring and the outer ring.

5. The spherical plain bearing according to claim 1, wherein the outer ring comprises two cavities extending around a central axis of the outer ring, the two cavities being respectively located in the vicinity of a first axial end and a second axial end of the outer ring.

6. The spherical plain bearing according to claim 1, wherein the internal cavity is annular.

7. A bearing assembly comprising:
    a spherical plain bearing including:
        an inner ring comprising an outer spherical contact surface, and
        an outer ring comprising an inner spherical contact surface,
        wherein the outer spherical contact surface of the inner ring cooperates with the inner spherical contact surface of the outer ring,
        wherein at least one of the inner ring and the outer ring comprises at least one internal cavity running on at least a portion of the circumference of the respective at least one of the inner ring and the outer ring, and a lubricant distribution device, wherein the lubricant distribution device is adapted to inject new lubricant in one of the at least one internal cavity of the at least one of the inner ring and the outer ring and to extract used lubricant from another cavity of the same at least one of the inner ring and the outer ring.

8. The bearing assembly according to claim 7, wherein on the at least one of the inner ring and the outer ring, the at least one internal cavity further comprises ducts extending towards the spherical contact surface of the respective at least one of the inner ring and the outer ring.

9. The bearing assembly according to claim 8, wherein a lubricant is inserted in the at least one internal cavity.

10. The bearing assembly according to claim 8, wherein the at least one of the inner ring and the outer ring further comprises grooves provided on the spherical contact surface of the respective at least one of the inner ring and the outer ring, and wherein the ducts open into the grooves.

11. The bearing assembly according to claim 7, wherein the at least one of the inner ring and the outer ring further comprises several cavities parallel to each other and extending around a central axis of the at least one of the inner ring and the outer ring.

12. The bearing assembly according to claim 7, wherein the outer ring comprises two cavities extending around a central axis of the outer ring, the two cavities being respectively located in the vicinity of a first axial end and a second axial end of the outer ring.

13. The bearing assembly according to claim 7, wherein the at least one internal cavity is annular and extend on the whole circumference of the at least one of the inner ring and the outer ring in which they are provided.

14. A spherical plain bearing comprising:

an inner ring comprising an outer spherical contact surface, and an outer ring comprising an inner spherical contact surface, wherein the outer spherical contact surface of the inner ring cooperates with the inner spherical contact surface of the outer ring, wherein at least one of the inner ring and the outer ring comprises at least one internal cavity running on at least a portion of the circumference of the respective at least one of the inner ring and the outer ring, wherein on the at least one of the inner ring and the outer ring the at least one internal cavity further comprises ducts extending towards the spherical contact surface of the respective at least one of the inner ring and the outer ring, and wherein the at least one of the inner ring and the outer ring further comprises grooves provided on the spherical contact surface of the respective at least one of the inner ring and the outer ring, and wherein the ducts open into the grooves.

* * * * *